United States Patent
Hellwig et al.

(10) Patent No.: US 9,497,758 B2
(45) Date of Patent: Nov. 15, 2016

(54) LATE ABIS ACTIVATION

(75) Inventors: Karl Hellwig, Wonfurt (DE); Dirk Kampmann, Vaals (NL);
(Continued)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 228 days.

(21) Appl. No.: 13/378,734

(22) PCT Filed: Aug. 20, 2009

(86) PCT No.: PCT/EP2009/060770
§ 371 (c)(1),
(2), (4) Date: Jan. 9, 2012

(87) PCT Pub. No.: WO2010/145719
PCT Pub. Date: Dec. 23, 2010

(65) Prior Publication Data
US 2012/0135740 A1    May 31, 2012

Related U.S. Application Data

(60) Provisional application No. 61/218,175, filed on Jun. 18, 2009.

(51) Int. Cl.
 *H04W 72/04* (2009.01)
 *H04W 28/26* (2009.01)
 *H04W 76/02* (2009.01)

(52) U.S. Cl.
 CPC ......... *H04W 72/0433* (2013.01); *H04W 28/26* (2013.01); *H04W 76/02* (2013.01)

(58) Field of Classification Search
 CPC ................. H04W 28/26; H04W 76/04; H04W 76/02
(Continued)

(56) References Cited

U.S. PATENT DOCUMENTS 6,799,042 B1* 9/2004 Kauhanen et al. ........... 455/450
2004/0092252 A1* 5/2004 Gustavsson et al. ...... 455/412.2
(Continued)

OTHER PUBLICATIONS

3rd Generation Partnership Project. "Technical Specification Group Core Network and Terminals; Bearer-Independent Circuit-Switched Core Network; Stage 2 (Release 8)." 3GPP TS 23.205 V8.6.0, F-06921, Jun. 2009, Chapters 6.1.1.2, 6.1.2.3, 6.1.1.4, 6.1.1.12, 6.1.2.4, 6.1.2.12, Sophia-Antipolis Cedex, France.
(Continued)

*Primary Examiner* — Un C Cho
*Assistant Examiner* — Fangyan Deng
(74) *Attorney, Agent, or Firm* — Patents on Demand, P.A.; Brian K. Buchheit; Scott M. Garrett (57) ABSTRACT

The Invention proposes a method for a Control Node (MSC) of a Core Network (CN) for late activation of a User Plane between a Radio Station (eNodeB, NodeB, BTS) and a control node (RNC, BSC) of a Radio Access Network (eUTRAN, UTRAN, URAN, GERAN, GRAN, RAN) of a call to be set-up. Furthermore, a method for a control node of a Radio Access Network for late activation of a User Plane between a Radio Station and a control node of a Radio Access of a call to be set-up is proposed MSC receives an indication that a call involving said MSC and a BSC of a RAN shall be set-up. MSC gains knowledge that said BSC is adapted for a late User Plane Activation. MSC instructs said BSC that the User Plane between the Radio Station and the BSC/RNC shall be reserved. Upon detecting that the User Plane of said call shall be through connected, MSC instructs the BSC to activate the reserved User Plane between Radio Station and BSC. In addition corresponding nodes are proposed.

20 Claims, 7 Drawing Sheets (75) Inventors: Majid Manosouri, Linköping (SE)

(58) Field of Classification Search
USPC .......................................... 370/329; 455/445
See application file for complete search history.

(56) References Cited

U.S. PATENT DOCUMENTS

| | | | |
|---|---|---|---|
| 2004/0223513 A1* | 11/2004 | Meago ........................ | 370/468 |
| 2005/0174952 A1* | 8/2005 | Sillasto et al. ............... | 370/278 |
| 2007/0097939 A1* | 5/2007 | Nylander et al. ............ | 370/338 |
| 2007/0127655 A1* | 6/2007 | Jung et al. .............. | 379/142.01 |
| 2010/0017509 A1* | 1/2010 | Frankkila et al. ............ | 709/224 |
| 2010/0322128 A1* | 12/2010 | Becker .................. | H04W 4/08 |
| | | | 370/312 |

OTHER PUBLICATIONS

3rd Generation Partnership Project. "Technical Specification Group Core Network and Terminals; Combining Circuit Switched (CS) and IP Multimedia Subsystem (IMS) Services; Stage 3 (Release 8)." 3GPP TS 24.279 V8.1.0, F-06921, Dec. 2008, pp. 1-76, Sophia-Antipolis Cedex, France.

3rd Generation Partnership Project. "Technical Specification Group Core Network (CN); Mobile Radio Interface Layer 3 Specification, Core Network Protocols; Stage 2 (Release 8)." 3GPP TS 23.108 V8.0.0, F-06921, Dec. 2008, pp. 1-34, Sophia-Antipolis Cedex, France.

* cited by examiner

LATE ABIS ACTIVATION

TECHNICAL FIELD

The invention relates to the field of telecommunication and more specific to the late activation of User Plane Resources towards the Radio Network.

BACKGROUND

The current invention deals with improvements relating to mobile communication standards, in particular, with improving the so called "last mile" between a radio base station and a radio access network or a portion thereof, avoiding unwanted or noticeable effects for the end users.

In today's circuit switched telecommunications networks payload traffic and signaling are handled in different logical networks. Signaling traffic pertains to the signaling plane while the payload traffic is transported in the user plane.

The user plane of a call between two radio terminals, such as GSM terminals, is routed from a Base Station Subsystem (BSS) network to a core network and back to a BSS network.

Such a network consists of several Interfaces, some of them are of particular interest in the following.

The A-Interface relates to the Interface between a Mobile Switching Center (MSC) and a Base Station Subsystem (BSS) controlled by the Base Station Controller (BSC). The Abis Interface relates to the Interface between a Base Station Controller (BSC) and a Base Station Transceiver (BTS). The Radio Interface relates to the Interface between a Base Station Transceiver (BTS) and a Mobile Station (MS). These terms refer to GSM like networks.

These interfaces have correspondences in an UMTS like network. There the correspondence to the A Interface is the Iu Interface between a Mobile Switching Center (MSC) and a Radio Network Controller (RNC). The correspondence to the Abis Interface is the Iub Interface between a Radio Network Controller (RNC) a NodeB and the correspondence to the Radio Interface is again the Radio Interface between NodeB and a User Equipment (UE).

In today's networks, the radio and Abis-Interface-resources and the A-Interface-resources are quite early in the call setup phase allocated to ensure their availability; this procedure is therefore often referenced as "early assignment".

Figure 1A:
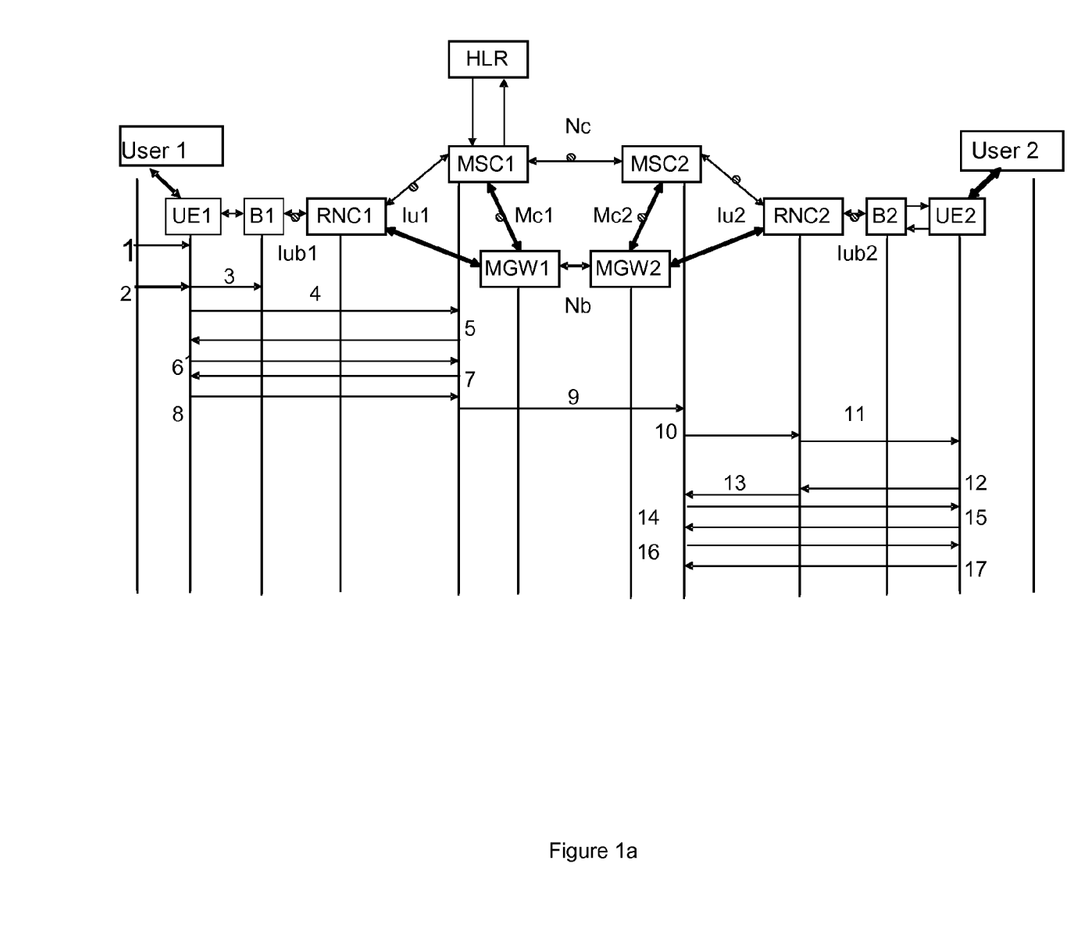
Figure 1B:
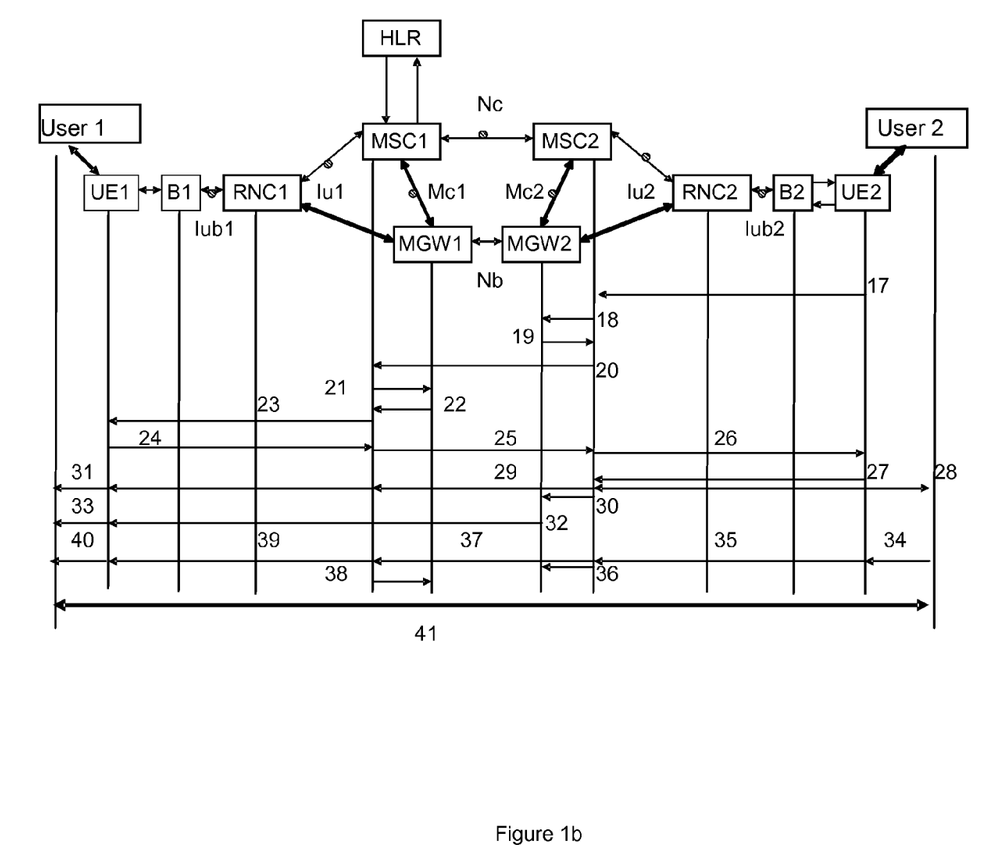

FIG. 1a and FIG. 1b shows a typical exemplary Call Flow for an early assignment.

There a UTRAN-based call with some typical timing values is shown.

After User 1 has decided to select a number in step 1, the number corresponding to User Equipment 2, and presses in step 2 the dial button, the User Equipment UE1 accesses B1 in a step 3 and in a step 4 the UE1 submits a Service Request towards MSC1. From pressing dial until now, around 1 second has passed.

Now the MSC1 asks in a step 5 the UE1 for authentication which is provided in step 6. Thereafter signaling is exchanged pertaining to the UE1 capabilities in steps 7 and 8. In the meantime, the MSC has interrogated an HLR for routing data of UE2 in the background.

Thereafter the MSC1 sends an IAM message with a codec (list) towards MSC2 in step 9.

MSC2 in turn instructs RNC2 to page the User Equipment 2 which is done in steps 10 and 11. The response is received in steps 12 and 13.

Now the MSC2 asks in a step 14 the UE2 for authentication which is provided in step 15. Thereafter signaling is exchanged pertaining to the UE2 capabilities in steps 16 and 17. Step 17 is displayed on FIG. 1a as last step and again on FIG. 1b as first step.

After having received capabilities in step 17, MSC 2 sends the selected codec towards MGW 2 in step 18 and receives back the address in step 19.

The MSC sends the selected codec and the address to MSC in step 20. The selected codec and the address is than send to MGW 1 in step 21 and acknowledged in step 22.

Thereafter, in step 23 the UE 1 is informed via RAB Assignment of the selected originating RAN Circuit which is acknowledged in step 24.

Shortly thereafter also the second Radio- and Iub-(Abis-)-legs of the User Plane are assigned towards the User 2 (the called user).

MSC 1 sends in step 25 a continuity message towards MSC 2 which in turn sends a corresponding RAB Assignment with the selected terminating RAN circuit towards UE 2 in step 26. The UE 2 acknowledges said message in step 27.

Now the User 2 hears a ringing in step 28 while the UE 2 reports towards the MSC 2 that it is Alerting.

From pressing the dial button until now around 5 seconds have passed.

A first learning thereof is that it takes about 5 seconds after User 1 (the calling user) pressed the "dial" button that the first Radio- and Iub-(Abis)-legs of the User Plane are assigned.

Now the MSC 2 reports towards MSC 1 in step 29 that it is Alerting while the MSC 1 instructs in step 30 the MGW2 to generate ring back tone.

MSC 1 on receiving Alerting message from MSC 1 in step 29 forwards said message towards the UE1, the UE 1 in turn shows alerting in step 31.

MGW 2 on receiving the generate ring back tone in step 30 generates the ring back tone in step 32 and provides the ring back tone towards the UE 1. The User 1 will hear in step 33 the generated ring back tone.

Now after some ring tones, another couple of seconds have passed, the User 2 accepts the call in a step 34. The UE 2 reports Connect towards the MSC 2 in step 35 which in turn instructs the MGW 2 to stop ring back tone and to connect to the UE 2 in step 36. In the meantime the MSC 2 also reports Connect towards MSC 1 in step 37.

MSC 1 in turn instructs MGW 1 in step 38 to connect in both directions and in another step 39 the Connect report is forwarded to the UE 1 which shows the connected state in a step 40 towards the User 1.

A second learning is that it takes another couple of seconds until the User 2 accepts a call if the User 2 accepts the call at all.

This time, where the called mobile is ringing is a waste of expensive resources. Often the called user is not at all accepting the call and the ringing phase may be very long and totally without success and without income for the operator at the end.

Hence, resources are assigned even though they may not be used for some time or not at all. These resources are then allocated and not available for other calls, although no speech communication is possible, until User 2 (the called user) accepts the call.

The problem becomes even worse in cases where the Iub-, Iu- (Abis- and A-) resources are routed via expensive or capacity limited links, such as satellite links, this leads to an inefficient usage of these expensive resources in an early stage.

PROBLEMS WITH EXISTING SOLUTION PROPOSALS

As already stated in many applications of mobile communication the "last mile" to a radio base station is rather expensive and/or bandwidth-limited. Sometimes the last mile—or even a portion thereof—is routed via satellite links that are expensive, bandwidth-limited and—in addition—introduce also long speech path delays.

Although in today's 3GPP Standard "late assignment" to save radio- and Abis-resources is foreseen, this is rarely—if at all—used due to the below mentioned disadvantages.

A first reason is the allocation of radio resources is never 100% guaranteed, but may fail, in some circumstance with some noticeable likelihood.

Therefore, if the radio resources are not allocated early in the call setup process, the risk increases that the call setup due to failure of radio resources fails, once the terminating user has accepted the call.

This provides towards the terminating User (the called User) the negative experience that although the Mobile Station/User Equipment has rung for a while the call fails even though the User accepted the call. This effect is also referred to as "ghost ringing" The disappointment will be on both sides of the attempted call, i.e. the calling user and the called user will be disappointed and may get a negative impression of the overall service offered. It's therefore held a better option that a call failure is known early to the originating User (oUser, calling User) and the terminating User (tUser, called User) is not made aware of a call failure. Hence, the called phone will only ring if the call shall be successful due to established resources.

A second reason is to ensure that the speech path is quickly through-connected, once the called user accepts the call; otherwise the first words of the communication could get lost, which would be quite nasty for the users.

The allocation of radio resources, even when successful, may take a considerable time, in the order of seconds. This is experienced as being too long for a smart call handling.

Depending on their cultural background most terminating Users (tUsers, called User) accept a call and start talking immediately.

If Late Assignment is employed, then the first words—, e.g. a greeting and name of terminating User (called User, tUser)—is lost and will not be heard by the calling User (originating User, oUser).

However, the Invention is not limited to the above mentioned case.

The handling of signaling plane and user plane (payload, voice) is performed as outlined above irrespective of the location of a call, more precisely: irrespective of the locations of the involved mobile stations.

Hence, even when the call is "local", i.e. both, the terminating and originating party, are served by the same Base Station Subsystem, e.g. within the same radio cell, the user plane is routed through the core network.

Currently it is under discussion in 3GPP standardization bodies to introduce "local switching" in case one single BTS (Base Transceiver Station) or one BTS-cluster or one single BSS (Base Station Subsystem is controlled by one Base Station Controller) is involved in the call, i.e. both radio terminals of a mobile-to-mobile call are served by the same radio access network.

This effort is driven to save expensive Abis-resources, if the call is a "local call" between two mobile stations in the same radio cell.

Figure 2:
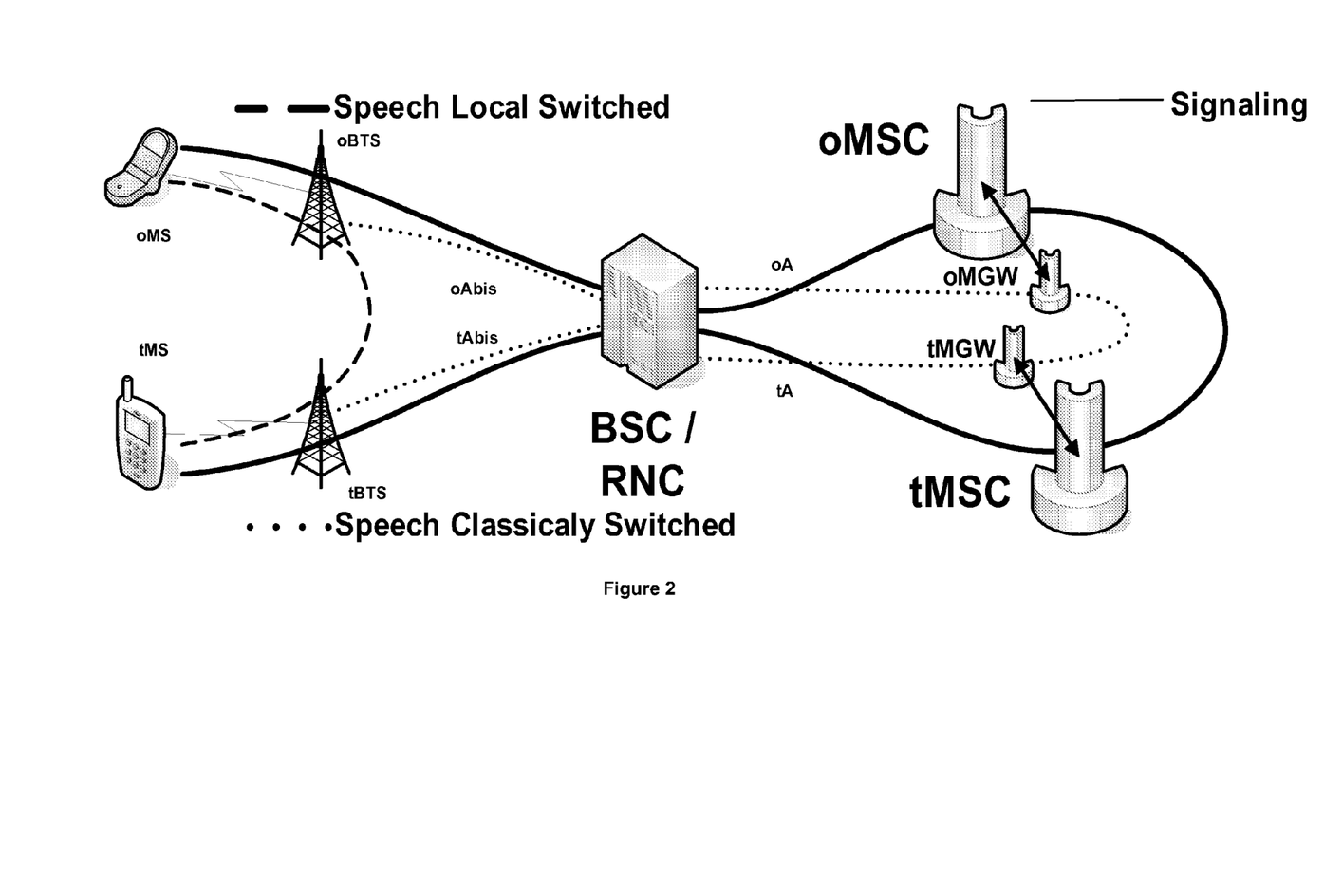
FIG. 2 shows a reference call scenario for a local call with a local shortcut.

FIG. 2 shows a reference call scenario for a local call with a local shortcut. This local shortcut is managed by the BSC/RNC as a Local Switch Node (LS-Node) autonomously, once it found out, e.g. with the help of the MSC that both call legs belong to the same call and the local shortcut is allowed.

There, an originating User (oMS) tries to establish a call towards a terminating User (tMS). Within the network a certain set of physical connections is available (not shown). Via these physical connections, logical connections for the signaling, shown as thick solid line, and payload, i.e. the User Plane, shown as dashed or dotted line might be established.

Both Users, originating User (oMS) and terminating User (tMS), are within an area which is served by a common Base Station Controller BSC or a common Radio Network Controller RNC. The signaling of said call would be routed via an originating MSC (oMSC) towards a terminating MSC (tMSC).

Without Local Switching, the User Plane transporting the payload, such as Voice, would—at best—routed via a common Media Gateway or routed via a terminating Media Gateway (tMGW) and an originating Media Gateway (oMGW) associated to the respective MSCs (tMSC, oMSC). The association of MGW and MSC is shown by arrows. This would be the classical switching of the user plane traffic indicated by the dotted line.

However, when Local Switching is detected, the User Plane is not established via the Core Network but directly with the Radio Access Network, i.e. shortcuted as shown by the dashed line in FIG. 2 by the Base Station Controller or by a Radio Network Controller as a Local Switch-Node (LS-Node).

Now a similar problem as described above may arise: during the ringing phase the Abis-resources (oAbis, tAbis) are already allocated and the terminating MSC (tMSC) generates the so called "ring-back tone" in order to inform the calling user that his call is treated properly and that the called user is hearing the ringing tone. Again the Abis/Iub-resources are "wasted" (at least most of them), until the terminating User (tMS) is accepting the call—which is sometimes very late or not even the case.

Existing standards would allow generating a ring-back tone locally inside the calling mobile—so the Abis/Iub-downlink towards the calling user is from a functional point of view not functionally necessary. But then an indication is missing for the BSC/RNC, when to through-connect the local shortcut.

So far, the MSC would tell the Mobile Station, when the called user has accepted the call and when to through-connect the call. This information is also sent to the corresponding MGW(s) (see FIG. 2). However, this information is not available to the BSC(s) or RNC(s).

If the BSC/RNC would through-connect the call by the local shortcut too early, then speech data could flow between both mobile stations without the "official" Connect message, i.e. without charging the calling user for this speech communication.

Adapting mobile stations/user equipment to accept such communication would be rather easy and would allow for communication without paying, i.e. from an operators view "fraud".

It is therefore not an option in Local Switching cases to allow for an early through-connect. However, if the BSC/RNC would through-connect the call too late, then the speech communication is endangered and unpleasant effect, such as lost words or sentences would occur.

Therefore, in said scenario the same detrimental effects as described above with respect to "Late Assignment" may be experienced.

The current Invention improves the call handling in a way that the operation of this "last mile" is improved avoiding the drawbacks known from the "Late Assignment" technique.

Although in the following the invention is described partly in UTRAN-terms (RNC, etc) and partly in GERAN-terms (BSC, etc), the invention is not limited thereto but applicable to any kind of radio access technology.

It is at least for this reasons, the failure of call setup after the called user accepts and/or the loss of first words, that the late assignment to save resources is not widely implemented.

All in all, the solutions presented so far are inflexible and/or create additional load and/or miss certain functionality and/or are not effective.

SUMMARY

To overcome one, more or all of the above mentioned drawbacks, the Invention proposes to introduce a method for a Control Node (MSC) of a Core Network (CN) for late activation of a User Plane between a Radio Station (eNodeB, NodeB, BTS) and a control node (RNC, BSC) of a Radio Access Network (eUTRAN, UTRAN, URAN, GERAN, GRAN, RAN) of a call to be set-up.

The Control Node (MSC) of a Core Network (CN) receives an indication that a call involving said Control node (MSC) of a Core Network (CN) and a control node (RNC, BSC) of a Radio Access Network (eUTRAN, UTRAN, URAN, GERAN, GRAN, RAN) shall be set-up. The Control Node (MSC) of a Core Network (CN) gains knowledge that said control node (RNC, BSC) of said Radio Access Network (eUTRAN, UTRAN, URAN, GERAN, GRAN, RAN) is adapted for a late User Plane Activation. The Control Node (MSC) of a Core Network (CN) instructs said control node (RNC, BSC) of said Radio Access Network (eUTRAN, UTRAN, URAN, GERAN, GRAN, RAN) that the User Plane between the Radio Station and the BSC/RNC shall be reserved. Upon detecting that the User Plane of said call shall be through connected, the Control Node (MSC) of a Core Network (CN) instructs the control node (RNC, BSC) of said Radio Access Network (eUTRAN, UTRAN, URAN, GERAN, GRAN, RAN) to activate the reserved User Plane between the Radio Station and the BSC/RNC.

Furthermore, the invention proposes a method for a control node (RNC, BSC) of a Radio Access Network (eUTRAN, UTRAN, URAN, GERAN, GRAN, RAN) for late activation of a User Plane between a Radio Station (eNodeB, NodeB, BTS) and a control node (RNC, BSC) of a Radio Access Network (eUTRAN, UTRAN, URAN, GERAN, GRAN, RAN) of a call to be set-up.

The control node (RNC, BSC) of a Radio Access Network (eUTRAN, UTRAN, URAN, GERAN, GRAN, RAN) receives an indication that a call involving a Control node (MSC) of a Core Network (CN) and said control node (RNC, BSC) of a Radio Access Network (eUTRAN, UTRAN, URAN, GERAN, GRAN, RAN) shall be set-up. The control node (RNC, BSC) of a Radio Access Network (eUTRAN, UTRAN, URAN, GERAN, GRAN, RAN) receives from said Control node (MSC) of a Core Network (CN) an Instruction that the User Plane between the Radio Station and the BSC/RNC shall be reserved and the control node (RNC, BSC) of a Radio Access Network (eUTRAN, UTRAN, URAN, GERAN, GRAN, RAN) receives an Indication to activate the reserved User Plane between the Radio Station and the BSC/RNC.

The invention furthermore provides for respective Nodes of the respective Networks employing the invention.

BRIEF DESCRIPTION OF THE DRAWINGS

FIGS. 1a and 1b shows a typical exemplary Call Flow for an early assignment, FIG. 1b being a continuation of the call flow shown in FIG. 1a.

DETAILED DESCRIPTION

In the following, the invention will be described with respect to the figures. It is to be understood that the explanations given in the following are not limited to a particular Radio Access Technology, but may be applied to any appropriate Telecommunication System. Furthermore, like references are used in the figures to indicate like elements.

In the following, reference will be made to FIGS. 3 and 6.

Figure 3:
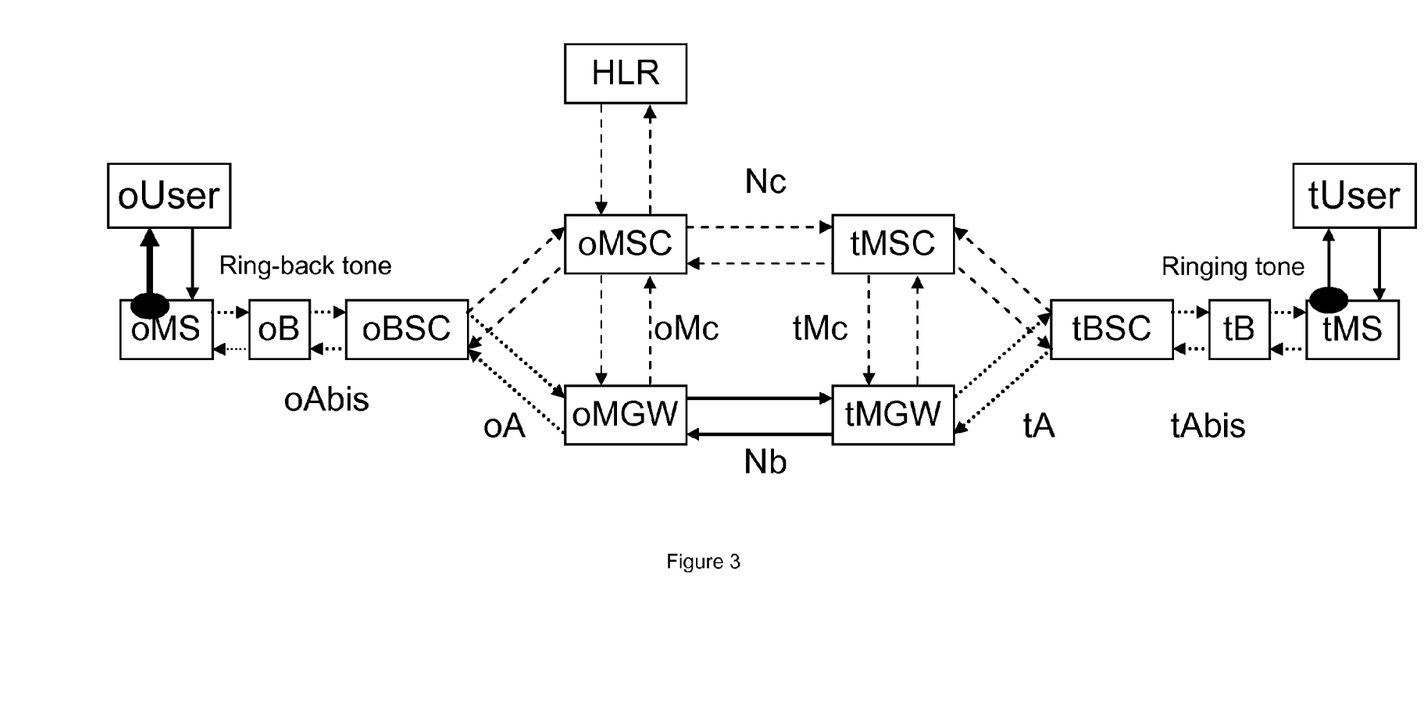
FIG. 3 shows a logical network and the respective User Plane and Signalling connections according to an embodiment of the invention.

FIG. 3 shows a logical network and its respective user plane and signaling connections. The set-up is quite similar to the one shown in FIGS. 1a and 1b displayed at the top. However, here the focus is on the connections to be established.

Figure 6:
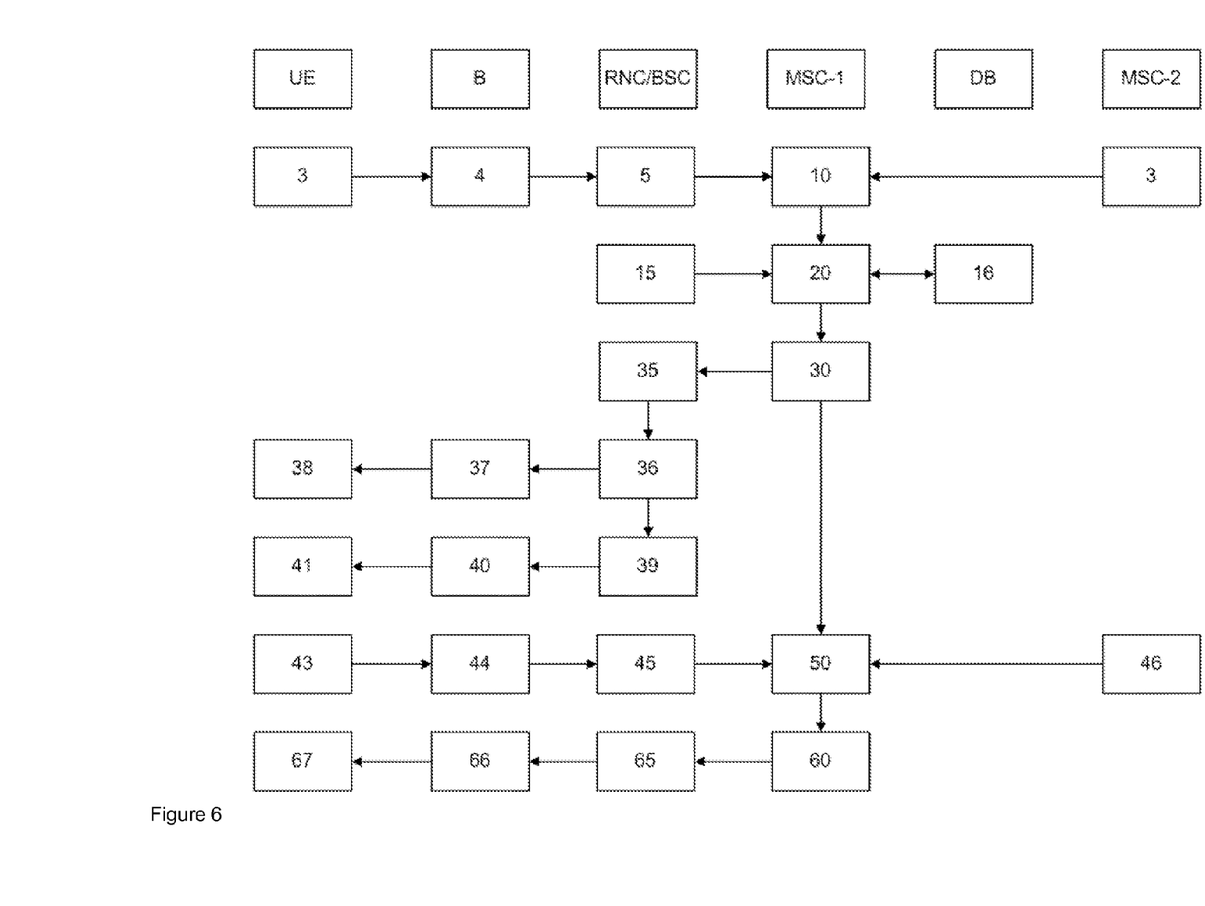
FIG. 6 shows an exemplary combined flowchart for a method performed by a Control Node of a Core Network and for a method performed by a Control Node of a Radio Access Network according to embodiments of the invention.

FIG. 6 shows an exemplary combined flowchart for a method performed by a Control Node of a Core Network and for a method performed by a Control Node of a Radio Access Network according to embodiments of the invention It should be noted in the following, although the invention is described for the case that both sides support late Abis Activation, the invention is not limited to this two-sided case but works for each Abis/Iub Interface—terminating and originating Side—independently, when only the terminating or the originating leg are enhanced to work according to the invention. When it is of importance, the difference will be denoted when discussing the flow chart shown in FIG. 6.

Furthermore, the steps described below may be ordered in another sequence and certain steps may even happen together. Hence, the references provided do not allow deducing a logical necessary order of these steps but only reflect an embodiment of order.

The Invention concerns several entities of a Mobile communication network. In particular, it concerns a Control Node of a Core Network (CN) such as a MSC and a control node of a Radio Access Network (eUTRAN, UTRAN, URAN, GERAN, GRAN, RAN) such as a BSC or RNC.

Although the invention is not limited to a particular technology, in the following terms relating to GSM technology is used.

There, a MSC-1, either a terminating MSC (tMSC) or an originating MSC (tMSC) receives in a step 10 an indication that a call involving said Control node (MSC) of a Core Network (CN) and a control node (RNC, BSC) of a Radio Access Network (eUTRAN, UTRAN, URAN, GERAN, GRAN, RAN) shall be set-up.

In an embodiment of the invention, the indication might be received in the case the MSC-1 is an originating MSC (oMSC) from a respective originating RAN control node (oBSC) which sent said indication in a step 5 towards MSC-1 acting as the originating MSC (oMSC) for said call. Said sending may be triggered by a call set-up received from the User Equipment UE acting as a originating Mobile Station (oMS), step 3 which in turn was receive by a respective radio station (B) acting as an originating radio station (oB) of the RAN and reported towards the RAN control node in a step 4.

In another embodiment of the invention, the indication might also be received in the case the MSC-1 is a terminating MSC (tMSC) from a respective terminating CN control node (oMSC) which sent said indication in a step 3 towards MSC-1 acting as the originating MSC (oMSC) for said call. Said indication might be forwarded to the terminating RNC/BSC.

In a step 20, the MSC-1 gains knowledge that respective BSC/RNC is adapted for a late User Plane Activation.

In case the MSC-1 is a terminating MSC (tMSC) than the respective BSC/RNC is the terminating BSC/RNC (tBSC). In case the MSC-1 is an originating MSC (oMSC) than the respective BSC/RNC is the originating BSC/RNC (oBSC).

In still another embodiment of the invention, gaining knowledge comprises receiving an indication from the RNC/BSC (oBSC, tBSC) that it is adapted for a late User Plane Activation. This might be accomplished by an extra message sent in a step 15 towards the MGW (oMSC, tMSC) or in that the indication is included in an already known call set-up message, e.g. as a new Information Element ("Last Mile") to an Assignment Request Message.

In still another embodiment, the MSC may instruct the respective BSC/RNC to set-up interfaces indicating that it is preferred to have some of the interfaces only reserved but not through connected.

Such an indication may be included in an already known call set-up message, e.g. as a new Information Element ("Last Mile") to an Assignment Request Message. In case the BSC/RNC is enabled to provide Late Abis Activation, it shall acknowledge accordingly. In case a BSC/RNC is enabled to provide Late Abis Activation, the standard procedure is to ignore the indication and to through connect.

In yet another embodiment of the invention, gaining knowledge comprises retrieving in a step 16 an information that the RNC/BSC (oBSC, tBSC) is adapted for a late User Plane Activation from a configuration database. Said configuration database may be internal or external to the MSC.

The method further comprises that in a step 30 said RNC/BSC (oBSC, tBSC) is instructed that the User Plane between the Radio Station B and the BSC/RNC shall be reserved. The corresponding message is received by the RNC/BSC (oBSC, tBSC) in a step 35.

The RNC/BSC (oBSC, tBSC) instructs the B (oB, tB) accordingly in a step 36 via signaling plane. The RNC/BSC (oBSC, tBSC) and B (oB, tB) accordingly reserve respective User Plane resources. The B (oB, tB) may set-up the User Plane towards the UE (tMS, oMS).

Once the MSC-1 acting either as a terminating or originating MSC in a step 50 that the User Plane of said call shall be through connected, it instructs in step 60 to activate the reserved User Plane between the Radio Station (oB, tB) and the RNC/BSC (oBSC, tBSC). The corresponding message is received by the RNC/BSC (oBSC, tBSC) in a step 65 which in turn instructs the respective Radio Station B (oB, tB).

According to an embodiment of the invention, wherein said MSC-1 is acting as terminating MSC (tMSC) controlling the terminating leg of said call to be set-up, the step of Detecting 50 that the User Plane of said call shall be through connected comprises receiving an indication that a terminating User Equipment of said call to be set-up requests to through connect the User Plane. Said indication is forwarded via the Signaling Plane from the terminating MSC (tMSC) towards the originating MSC (oMSC), e.g. in a corresponding step 45. Said indication is triggered by an terminating User Equipment (tMS) in a step 43 which is received in Radio Station B (tB) and forwarded in a step 44 towards the controlling BSC/RNC (tBSC) where it is forwarded in a step 45 towards the MSC-1 is acting as terminating MSC (tMSC).

According to an embodiment of the invention, wherein said MSC-1 is acting as an originating MSC (oMSC) controlling the originating leg of said call to be set-up, the step of Detecting 50 that the User Plane of said call shall be through connected comprises receiving in a step 46 from a terminating MSC (tMSC) controlling the terminating leg of said call to be set-up an indication to through connect the User Plane. This might be an indication as indicated above, i.e. an indication received by an oMSC as outlined in step 45.

In a further embodiment of the invention, RNC/BSC acting as originating RNC/BSC (oBSC) instructs in a step 39, that the originating User Equipment (oMS) shall generate a local ring back tone. This instruction is forwarded by the Radio Station B (oB) in a step 40. The terminating UE (tMS) starts ringing upon receiving the instruction in step 41.

In still a further embodiment, the Radio Station B acting either as a terminating or as an originating Radio Station B or any other appropriate node of the Radio Network may generate special user plane data towards the User Equipment. This sending of User Plane data might be instructed e.g. after reserving User Plane resources, e.g. in alternative steps 39-41 or it might be preconfigured within the Radio Station B to generate this user data on the A Interface.

According to a further embodiment the special user plane data is selected from a group comprising Codec Homing Frames and SID frames.

Codec Homing frames are specified for each Codec Type (and Codec Mode) and are fixed bit patterns that lead to a Reset of the User Plane processing within the MS and in that way keep all State-variables within the Speech decoder in their initial State and produce a perfectly silent output. Codec Homing frames are treated by the Radio Station B (oB, tB) like any speech frame and so the radio interface is filled, then radio link measurements are possible (even better than ever, since the bit pattern is perfectly known).

SID frames are a kind of artificial background noise. It could be embodied in stored SID frames, which are sent in case of single rate codecs e.g. every 480 ms or in case of multiple rate codecs such as AMR and AMR- Wideband e.g. every 160 ms. In that way the downlink radio activity could be minimized, while still allowing for radio link measurements although these might be less accurate.

By sending the special user data on the downlink towards the respective User Equipment (oMS, tMS) it is achieved that the User Equipment is not alarmed of the silence which could be misinterpreted otherwise as a connection failure which could lead to a termination of the call attempt.

Furthermore, sending user plane data also allows for radio link measurements and Transmitter Power Control. Furthermore, in case an Adaptive voice Codec such as AMR is employed, further negative effects can be avoided by sending appropriate data.

In the same manner as described above, it is also possible to save A-Interface/Iu-Interface resources. This might be provided as an addition or as a standalone solution.

The Invention as described above can be employed in call cases where there are several Radio access Networks involved or in so called Local Calls which may Locally switched as described above.

As outlined above, some of the indications may be provided as a new Information Element in an Assignment Request sent from an MSC to a respective RNC/BSC.

Such an Information Element may be arranged such that it comprises several bit fields. A first bit filed may indicate "Abis/Iub/A/Iu saving" enablement. A further bit may indicate that "Abis/Iu resources" shall be reserved but not through connected. Still a further bit may indicate that "A/Iu resources" shall be reserved but not through connected.

Still a further bit may indicate that reserved resources shall be through connected. If this bit is set, the other bits within the Information Element may be ignored by the BSC/RNC.

Obviously, the "Abis/Iub resources" and "A/Iu resources" indication may be set independently of each other.

If all of the above indications are used they may be coded in an octet.

Another Information element may be provided in an Assignment Acknowledgement. This information element may be used to indicate towards an MSC that the BSC/RNC is supporting Late Abis functionality.

Alternatively, the BSC/RNC may indicate in a Complete Layer 3 its capabilities to support Late Abis Activation. In case the receiving MSC does not understand the indication, it will just ignore it. In case it does understand the indication, i.e. it is supporting Late Abis Activation it will proceed with corresponding messages containing respective Indications directed towards Late Abis Activation.

Furthermore, as outlined above, when a connect for the User Plane is received in the MSC, the corresponding BSC needs to be informed to through connect the reserved User Plane resources. This can be accomplished by a new message to be sent towards the BSC and may be further enhanced by an acknowledgement received in response to a successful through-connect by the BSC/RNC.

By means of the invention it is provided for savings relating to the Abis/Iub Interface and/or A/Iu Interface. Thereby scarce resources are available for other calls. In particular savings can be achieved when a successful call is connected through but also in case a call attempt is unsuccessful.

The invention is also embodied in like nodes performing the above described methods.

An exemplary Control Node of a Core Network (CN) 100 which may embody the invention is a MSC or an MSC-Server. However, any other Node of the Core Network handling signalling of the Core Network may allow for embodying the invention.

Figure 4:
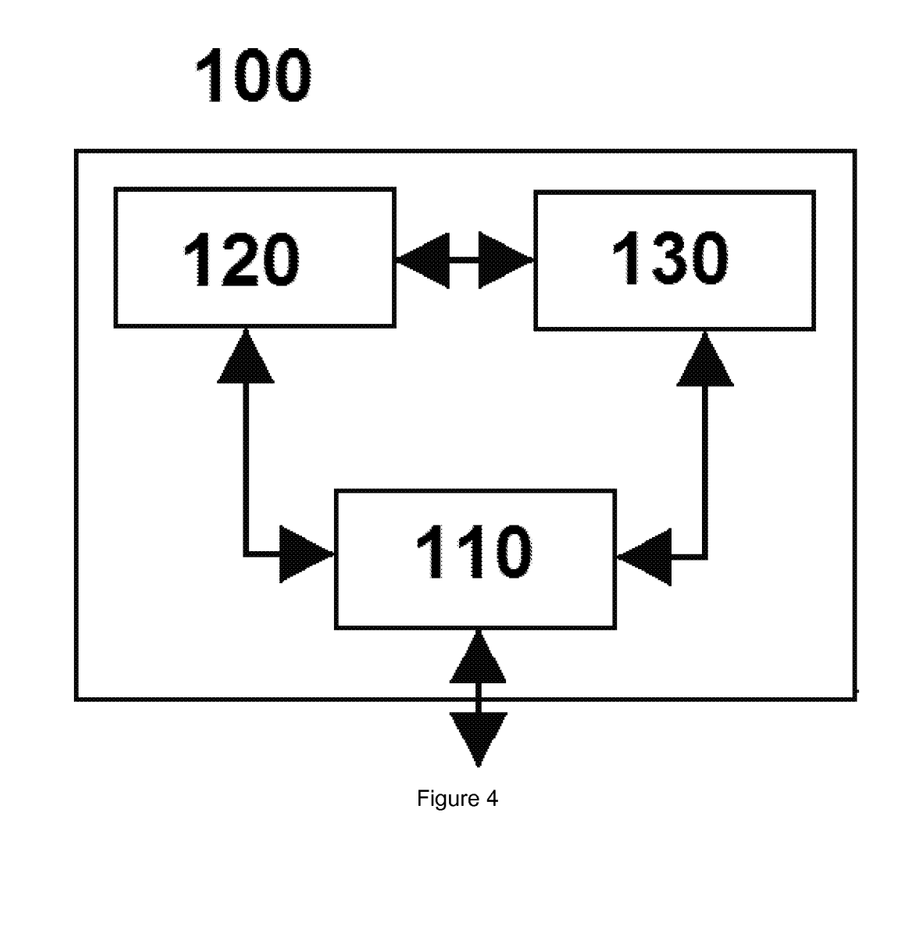
FIG. 4 shows exemplary Radio Access Network Node according to an embodiment of the invention

An exemplary Control Node of a Core Network (CN) for late activation of a User Plane between a Radio Station (eNodeB, NodeB, BTS) and a control node (RNC, BSC) of a Radio Access Network (eUTRAN, UTRAN, URAN, GERAN, GRAN, RAN) 200 of a call to be set-up is depicted in FIG. 4.

Said exemplary Control Node of a Core Network (CN) 100 comprises Means for Receiving 110 an indication that a call involving said Control node (MSC) of a Core Network (CN) and a control node (RNC, BSC) of a Radio Access Network (eUTRAN, UTRAN, URAN, GERAN, GRAN, RAN) shall be set-up.

Said Means for Receiving 110 may be embodied as an Input part of an Input/Output unit, a Network Interface Card or the like.

Furthermore, said exemplary Control Node of a Core Network (CN) 100 comprises Means for Processing 120 adapted to gain knowledge that said control node (RNC, BSC) of said Radio Access Network (eUTRAN, UTRAN, URAN, GERAN, GRAN, RAN) is adapted for a late User Plane Activation. Said Means for Processing 120 are further adapted to detect that the User Plane of said call shall be through connected, and Said Means for Processing 120 may be embodied as a processor including a Digital Signal Processor (DSP) or controller or may even be embodied in an ASIC or a FPGA or any other appropriate device.

Furthermore, said exemplary Control Node of a Core Network (CN) 100 comprises Means for Sending 110 an Instruction to said control node (RNC, BSC) of said Radio Access Network (eUTRAN, UTRAN, URAN, GERAN, GRAN, RAN) that the User Plane between the Radio Station and the BSC/RNC shall be reserved. Said Means for Sending 110 are further adapted to send an Instruction to the control node (RNC, BSC) of said Radio Access Network (eUTRAN, UTRAN, URAN, GERAN, GRAN, RAN) to activate the reserved User Plane between the Radio Station and the BSC/RNC, responsive to detection that the User Plane of said call shall be through connected Said Means for Sending 110 may be embodied as an Output part of an Input/Output unit, a Network Interface Card or the like.

In a further embodiment, the means for Receiving 110 are adapted to receive an indication from said control node (RNC, BSC) of said Radio Access Network (eUTRAN, UTRAN, URAN, GERAN, GRAN, RAN) that it is adapted for a late User Plane Activation.

In a further embodiment, the Means for Processing 120 are adapted to retrieve an information that said control node (RNC, BSC) of said Radio Access Network (eUTRAN, UTRAN, URAN, GERAN, GRAN, RAN) is adapted for a late User Plane Activation from a configuration database.

In another further embodiment the Control Node (MSC) of a Core Network (CN) 100 is adapted to control the terminating leg of said call to be set-up and said Means for Receiving 110 are adapted to receive an indication that a terminating User Equipment of said call to be set-up requests to through connect the User Plane.

In yet another further embodiment the Control Node (MSC) of a Core Network (CN) 100 is adapted to control the originating leg of said call to be set-up and said Means for Receiving 110 are adapted to receive from a Control Node (MSC) of a Core Network (CN) controlling the terminating leg of said call to be set-up an indication to through connect the User Plane.

An exemplary control node (RNC, BSC) of a Radio Access Network (eUTRAN, UTRAN, URAN, GERAN, GRAN, RAN) 200 which may embody the invention is a BSC or a RNC. However, any other Node of the Radio Access Network handling signalling of the Radio Access Network may allow for embodying the invention.

Figure 5:
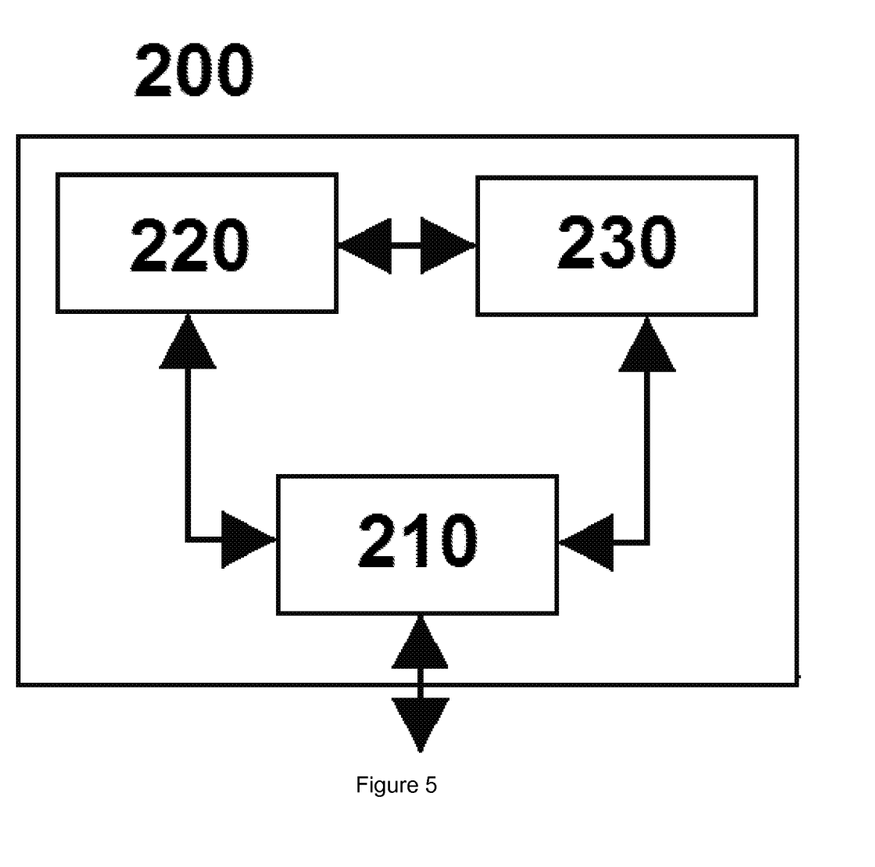
FIG. 5 shows an exemplary Core Network Node according to an embodiment of the invention.

An exemplary control node (RNC, BSC) of a Radio Access Network (eUTRAN, UTRAN, URAN, GERAN, GRAN, RAN) for late activation of a User Plane between a Radio Station (eNodeB, NodeB, BTS) and a control node (RNC, BSC) of a Radio Access Network (eUTRAN, UTRAN, URAN, GERAN, GRAN, RAN) 200 of a call to be set-up is depicted in FIG. 5.

Said exemplary control node (RNC, BSC) of a Radio Access Network (eUTRAN, UTRAN, URAN, GERAN, GRAN, RAN) 200 comprises Means for Receiving 210 an indication that a call involving a Control node (MSC) of a Core Network (CN) and said control node (RNC, BSC) of a Radio Access Network (eUTRAN, UTRAN, URAN, GERAN, GRAN, RAN) shall be set-up. Said Means for Receiving are further adapted to receive from said Control node (MSC) of a Core Network (CN) an Instruction that the User Plane between the Radio Station and the BSC/RNC shall be reserved. Said Means for Receiving are further adapted to receive an Indication to activate the reserved User Plane between the Radio Station and the BSC/RNC.

Said Means for Receiving 210 may be embodied as an Input part of an Input/Output unit, a Network Interface Card or the like.

Furthermore, Said exemplary control node (RNC, BSC) of a Radio Access Network (eUTRAN, UTRAN, URAN, GERAN, GRAN, RAN) 200 comprises Means for Processing 220 adapted to activate the reserved User Plane between the Radio Station and the BSC/RNC, responsive to the reception of the indication to activate the reserved User Plane.

Said Means for Processing 220 may be embodied as a processor including a Digital Signal Processor (DSP) or controller or may even be embodied in an ASIC or a FPGA or any other appropriate device.

In a further embodiment, said exemplary control node (RNC, BSC) of a Radio Access Network (eUTRAN, UTRAN, URAN, GERAN, GRAN, RAN) 200 comprises Means for Sending 210 to said Control node (MSC) of a Core Network (CN) an indication that the control node (RNC, BSC) of a Radio Access Network (eUTRAN, UTRAN, URAN, GERAN, GRAN, RAN) is adapted for a late User Plane Activation.

Said Means for Sending 210 may be embodied as an Output part of an Input/Output unit, a Network Interface Card or the like.

In a further embodiment, said control node (RNC, BSC) of a Radio Access Network (eUTRAN, UTRAN, URAN, GERAN, GRAN, RAN) 200 is adapted to control the terminating radio leg of said call to be set-up and said Means for Receiving 210 are further adapted to receive said indication to activate the reserved User Plane between the Radio Station and the BSC/RNC from the terminating User Equipment.

In a further embodiment, said control node (RNC, BSC) of a Radio Access Network (eUTRAN, UTRAN, URAN, GERAN, GRAN, RAN) 200 is adapted to control the originating radio leg of said call to be set-up and said Means for Receiving 210 are further adapted to receive said indication to activate the reserved User Plane between the Radio Station and the BSC/RNC from a Control Node (MSC) of a Core Network (CN) controlling the originating leg of said call to be set-up an indication to through connect the User Plane.

In another further said control node (RNC, BSC) of a Radio Access Network (eUTRAN, UTRAN, URAN, GERAN, GRAN, RAN) 200 said Means for Processing 220 are further adapted to instruct the originating User Equipment to generate a local ring back tone.

In yet another further said control node (RNC, BSC) of a Radio Access Network (eUTRAN, UTRAN, URAN, GERAN, GRAN, RAN) 200 said Means for Processing 220 are further adapted to instruct the Radio Station (eNodeB, NodeB, BTS) of said Radio Access Network (eUTRAN, UTRAN, URAN, GERAN, GRAN, RAN) to send special user plane data towards the User Equipment.

In still another further said control node (RNC, BSC) of a Radio Access Network (eUTRAN, UTRAN, URAN, GERAN, GRAN, RAN) 200 the special user plane data is selected from a group comprising Codec Homing Frames and SID frames.

Obviously, all the methods as presented above may be embodied in hardware, software enabled hardware and software offering the corresponding program logic itself when run on a corresponding programmable device, either in part or as a whole.

By means of the invention it is provided for a saving of resources in the Core Network allowing to increase the capacity and even more allows for improved Quality since the less transporting happens the less delay is introduced leading to an improved user experience.

Furthermore, by means of the invention it is provided for an easy deployment necessitating no O&M activity.

Abbreviations

3GPP 3rd generation Partnership Project
A A-Interface between BSS and CN
Abis Abis-Interface between BTS and BSC
B (also Node B) Base station, e.g. in UTRAN
BSC Base Station Controller
BSS Base Station Subsystem (may include one or more BTS and BSC)
BSSAP Base Station System Application Part
BTS Base Transceiver Station
CN Core Network
GSM Global System for Mobile communications
GERAN GSM-EDGE Radio Access Network
HO Handover
ID Identifier
Iub Iub-Interface between B and RNC
Iu Iu-Interface between RNS and CN
MSC Mobile Switching Center
MSS Mobile Soft Switch (Core Network)
MGW Media Gateway
MSC Mobile Service Switching Centre
RAT Radio Access Technology
RNC Radio Network Controller
RNS Radio Network System (may include one or more B and RNC)
UMTS Universal Mobile Telecommunication System
UTRAN Universal Telecommunication Radio Access Network

The invention claimed is:

1. A method for late activation of a call to be set up in a user plane between a Base Station and a Radio Access Network (RAN) control node, the method being implemented in a Mobile Switching Center (MSC), and comprising:
receiving an indication that a call involving the MSC and the RAN control node shall be set up;
determining that the RAN control node is configured for late user plane activation by retrieving information that the RAN control node is configured for late user plane activation from a configuration database;

instructing the RAN control node that user plane resources between the Base Station and the RAN control node shall be reserved;
detecting that the user plane of the call shall be through connected; and
responsive to detecting that the user plane of the call shall be through connected, instructing the RAN control node to activate the reserved user plane resources between the Base Station and the RAN control node.

2. The method of claim 1 wherein the MSC controls a terminating leg of the call to be set up; and wherein the step of detecting that the user plane of the call shall be through connected comprises receiving an indication that a terminating user equipment of the call to be set up requests to through connect the user plane.

3. The method of claim 1 wherein the MSC controls an originating leg of the call to be set up; and wherein the step of detecting that the user plane of the call shall be through connected comprises receiving an indication from the MSC controlling a terminating leg of the call to be set up to through connect the user plane.

4. A method for late activation of a call to be set up in a user plane between a Base Station and a Radio Access Network (RAN) control node, the method being implemented in the RAN control node, and comprising:
receiving an indication that a call involving a Mobile Switching Center (MSC) and the RAN control node shall be set up;
sending to the MSC an indication that the RAN control node is configured for late user plane activation, wherein the RAN control node retrieves information that the RAN control node is configured for late user plane activation from a configuration database, wherein the indication from the RAN control node is made responsive to a determination by the RAN control node based upon the received information from the configuration database;
receiving from the MSC an instruction that user plane resources between the Base Station and the RAN control node shall be reserved;
receiving an indication to activate the reserved user plane resources between the Base Station and the RAN control node; and
responsive to receiving the indication to activate the reserved user plane resources, activating the reserved user plane resources between the Base Station and the RAN control node.

5. The method of claim 4 wherein the RAN control node controls a terminating radio leg of the call to be set up; and wherein the indication to activate the reserved user plane resources between the Base Station and the RAN control node is received from a terminating user equipment.

6. The method of claim 4 wherein the RAN control node controls an originating radio leg of the call to be set up; and wherein the indication to activate the reserved user plane resources between the Base Station and the RAN control node is received from the MSC controlling an originating leg of the call to be set up.

7. The method of claim 6 further comprising instructing an originating user equipment to generate a local ring back tone.

8. The method of claim 4 further comprising instructing the Base Station to send special user plane data towards at least one of an originating or a terminating user equipment.

9. The method of claim 8 wherein the special user plane data is selected from a group comprising Codec Homing Frames and SID frames.

10. A Mobile Switching Center (MSC) operative to perform late activation of a user plane between a Base Station and a Radio Access Network (RAN) control node, the MSC being configured to:
receive an indication that a call involving the MSC and a Radio Access Network (RAN) control node shall be set up;
determine that the RAN control node is configured for late user plane activation by retrieving information that the RAN control node is configured for late user plane activation from a configuration database;
transmit an instruction to the RAN control node to reserve user plane resources between the Base Station and the RAN control node;
detect that the user plane of the call shall be through connected; and
send an instruction to the RAN control node to activate the reserved user plane resources between the Base Station and the RAN control node, responsive to detecting that the user plane of the call shall be through connected.

11. The MSC of claim 10 wherein the MSC is further configured to receive an indication from the RAN control node that the RAN control node is configured for late user plane activation.

12. The MSC of claim 10 wherein the MSC is further configured to retrieve information that the RAN control node is configured for late user plane activation from a configuration database.

13. The MSC of claim 10 wherein the MSC is further configured to control a terminating leg of the call to be set up and to receive an indication that a terminating user equipment of the call to be set up requests to through connect the user plane.

14. The MSC of claim 10 wherein the MSC is further configured to control an originating leg of the call to be set up and to receive from the MSC controlling a terminating leg of the call to be set up.

15. A Radio Access Network (RAN) control node operative to implement late activation of a user plane between a Base Station and the RAN control node of a call to be set up, the RAN control node being configured to:
receive an indication that a call involving a Mobile Switching Center (MSC) and the RAN control node shall be set up;
send to the MSC an indication that the RAN control node is configured for late user plane activation, wherein the RAN control node determines late user plane activation by retrieving information that the RAN control node is configured for late user plane activation from a configuration database;
receive from the MSC an instruction that user plane resources between the Base Station and the RAN control node shall be reserved;
receive an indication to activate the reserved user plane resources between the Base Station and the RAN control node; and
activate the reserved user plane resources between the Base Station and the RAN control node, responsive to reception of the indication to activate the reserved user plane resources.

16. The RAN control node of claim 15:
wherein the RAN control node is further configured to control the terminating radio leg of the call to be set up; and
wherein the RAN control node is further configured to receive the indication to activate the reserved user plane resources between the Base Station and the RAN control node from a terminating user equipment.

17. The RAN control node of claim 15:
wherein the RAN control node is further configured to control an originating radio leg of the call to be set up; and
wherein the RAN control node is further configured to receive the indication to activate the reserved user plane resources between the Base Station and the RAN control node from an MSC controlling the originating leg of the call to be set up.

18. The RAN control node of claim 16, wherein RAN control node is further configured to instruct the originating user equipment to generate a local ring back tone.

19. The RAN control node of claim 15, wherein the RAN control node is further configured to instruct the Base Station to send special user plane data towards at least one of an originating user equipment or a terminating user equipment.

20. The RAN control node of claim 19, wherein the special user plane data is selected from a group comprising Codec Homing Frames and SID frames.

* * * * *